United States Patent
Maerzhaeuser et al.

(10) Patent No.: US 6,527,281 B2
(45) Date of Patent: Mar. 4, 2003

(54) JAW FOR A JAW CHUCK

(75) Inventors: Peter Maerzhaeuser, Steinebach (DE); Hans-Peter Schmid, Pfalzgrafenweiler (DE)

(73) Assignees: United Hardmetal GmbH, Horb (DE); LVT Loet- und Verschleisstechnik GmbH, Steinebach (DE)

(*) Notice: Subject to any disclaimer, the term of this patent is extended or adjusted under 35 U.S.C. 154(b) by 0 days.

(21) Appl. No.: 09/997,141

(22) Filed: Nov. 29, 2001

(65) Prior Publication Data

US 2002/0070508 A1 Jun. 13, 2002

(30) Foreign Application Priority Data

Dec. 12, 2000 (DE) .......................... 200 21 045

(51) Int. Cl.$^7$ ............................... B23B 31/12
(52) U.S. Cl. ........................ 279/60; 279/123
(58) Field of Search ............... 279/60–65, 158, 279/123

(56) References Cited

U.S. PATENT DOCUMENTS

| 4,752,165 | A | * | 6/1988 | Wanner | 279/60 |
| 4,778,730 | A | | 10/1988 | Zucker | |
| 4,968,191 | A | * | 11/1990 | Palm | 279/61 |
| 5,340,128 | A | | 8/1994 | Weiss et al. | 279/60 |
| 6,227,549 | B1 | * | 5/2001 | Michel | 279/60 |
| 6,378,399 | B1 | * | 4/2002 | Bangert | 81/57.15 |

FOREIGN PATENT DOCUMENTS

| DE | 38 29 033 A1 | 3/1989 |
| DE | 39 29 857 A1 | 3/1991 |
| DE | 42 09 307 | 1/1993 |

* cited by examiner

*Primary Examiner*—Steven C. Bishop
(74) *Attorney, Agent, or Firm*—Bachman & LaPointe, P.C.

(57) ABSTRACT

A clamping jaw for a jaw chuck comprises a base body of metal, wherein a hard metal clamping surface is fixed onto the base body. The clamping surface is formed of a plurality of hard metal particles of angular configuration.

7 Claims, 1 Drawing Sheet

JAW FOR A JAW CHUCK

BACKGROUND OF THE INVENTION

The invention pertains to a clamping jaw for a jaw chuck and, more particularly, a clamping jaw having a clamping surface comprising hard metal particles.

Jaw chucks for drills, lathes or milling machines are known. They contain clamping jaws that can be adjusted with respect to their distance from one another in order to clamp in position a usually cylindrical tool (tool shaft) or work piece. The clamping jaws of high-quality jaw chucks contain a base body of steel, the clamping surface of which is provided with a plate, strip or the like of hard metal in order to reduce the wear. This hard metal part is connected to the base body by means of hard soldering. The clamping surface of the clamping jaw represents the surface or edge which adjoins the tool or work piece when the tool or work piece is clamped in position. The hard metal part reduces the wear of the clamping jaw and increases the clamping accuracy coaxially to the jaw chuck over an extended period of time and a corresponding number of clamping and releasing processes.

However, the different thermal expansions of hard metal and steel cause the clamping jaws to distort when they are cooled after the hard soldering process, i.e., the base body is bent. This is the reason why the base body is ground after the hard soldering process in order to achieve a high clamping accuracy. The subsequent grinding process has the disadvantage of an additional expenditure of labor. In addition, grinding tracks remain on the clamping jaw due to the subsequent grinding process, with said grinding tracks making it possible to recognize that the clamping jaw was subjected to a subsequent grinding process. This is undesirable for aesthetic reasons. The front end faces of clamping jaws that were subjected to a subsequent grinding process also appear differently large. This may be recognizable when the jaw chuck is assembled and the clamping jaws are moved toward one another. Even if a clamping jaw that was subjected to a subsequent grinding process is technically flawless, it may give rise to the impression that the clamping jaw represents a reject that was subsequently processed in order to be used after all. Consequently, it might appear that the quality of a subsequently ground clamping jaw is inferior.

It is an object of the present invention to provide a clamping jaw with a clamping surface that is equipped with a hard metal in which a subsequent grinding of the base body is not required.

SUMMARY OF THE INVENTION

The foregoing object is achieved by way of the present invention wherein the clamping surface of the clamping jaw is provided with hard metal particles instead of a continuous hard metal part. The hard metal particles are connected to the base body of the clamping jaw by means of hard soldering. The hard metal particles may consist of grains or a granulate of hard metal. The hard metal particles do not exert tension or pressure upon the base body of the clamping jaw as a result of different thermal expansions when the clamping jaw is cooled after the hard soldering process, i.e., the base body is not deformed. The dimensional accuracy of the clamping jaw according to the invention consequently is increased such that a subsequent grinding of the base body for achieving a sufficient dimensional accuracy is longer required.

Instead of using a base body of steel, the base body of the clamping jaw according to the invention may consist of the different metal.

In order to achieve a stable fit of a tool or work piece to be clamped in position, the hard metal particles provided on the clamping surface of the clamping jaw according to the invention are angular in preferred embodiments of the invention. The angular particles press against the clamped tool or work piece with their edges and corners and consequently hold the tool or work piece in a stable fashion.

In order to achieve a sufficiently high clamping accuracy, it may be required in embodiments of the invention to shape, in particular, grind, the particles that form the clamping surface after the hard soldering process. Under certain circumstances, a shaping of the clamping surface is not necessary if the hard metal particles were applied onto the clamping surface of the base body with a sufficient accuracy before the hard soldering process and did not change their position during the hard soldering process.

DESCRIPTION OF THE DRAWINGS

The invention is described in greater detail below with reference to one embodiment that is illustrated in the FIGURE. The only FIGURE shows a clamping jaw according to the invention in the form of a perspective representation.

DETAILED DESCRIPTION OF THE DRAWINGS

Figure 1:
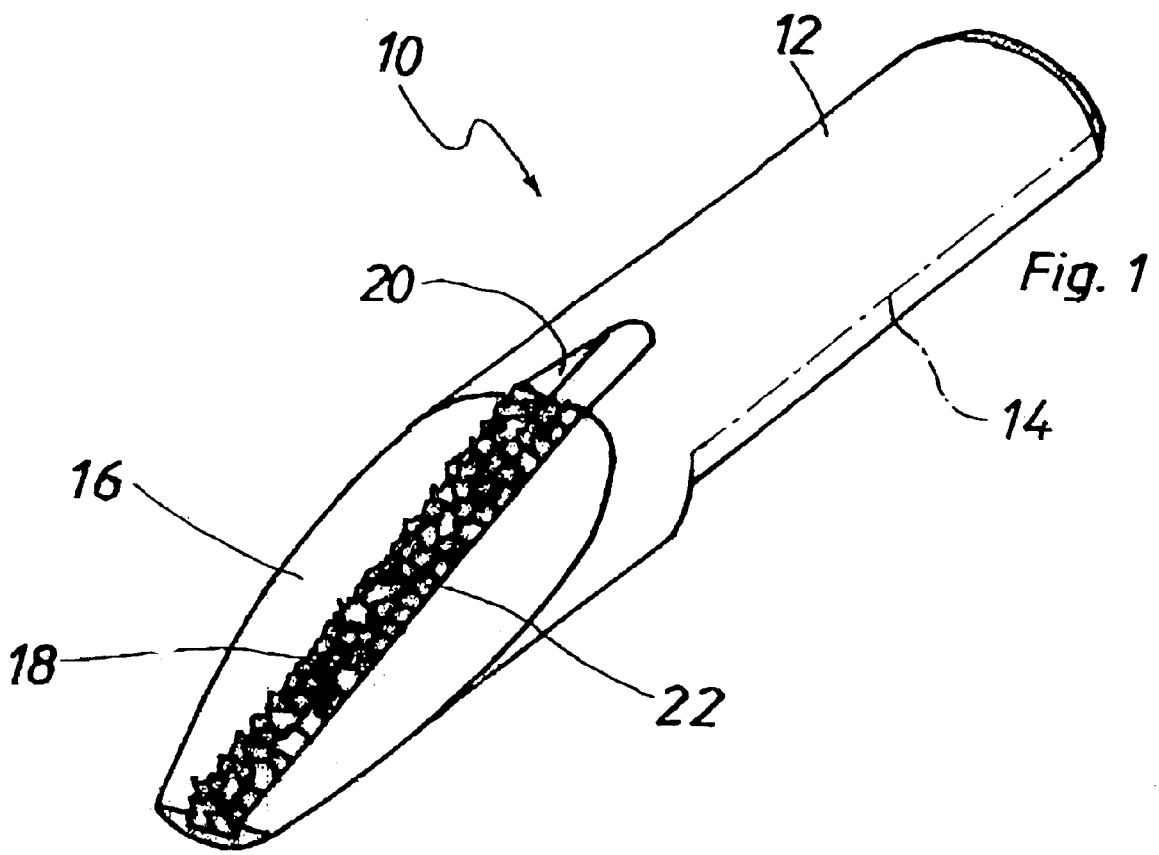

The clamping jaw 10 according to the invention which is illustrated in the figure contains a base body 12 of steel. The base body 12 essentially has a cylindrical shape. A rack-shaped toothing 14 is arranged over part of the length of the clamping jaw 10 on one side in order to displace the clamping jaw 10, for example, when clamping a drill in a drill chuck (jaw chuck). The toothing 14 is indicated in the figure with a dot-dash line. On one side, the clamping jaw 10 ends in an inclined surface 16 that is situated on the opposite side of the toothing 14 and inclined with respect to the longitudinal axis of the base 12. The clamping surface 18 is formed by providing the base body 12 of the clamping jaw 10 with a longitudinal groove 20 in the region of the inclined surface 16, wherein a hard metal granulate 22 is embedded in said longitudinal groove and connected to the base body 12 by means of hard soldering, as is known in the soldering art. The hard metal granulate 22 contains hard metal particles of angular configuration that form the clamping surface 18. If the arrangement of the hard metal granulate 22 is not sufficiently accurate after the hard soldering process, the hard metal granulate 22 can be shaped by means of grinding after the hard soldering process.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A clamping jaw comprises a metal base body and a clamping surface fixed to the metal base body, the clamping surface comprises a plurality of hard metal particles solder bonded to each other and to at least a portion of clamping surface.

2. A clamping jaw according to claim 1, wherein the hard metal particles are of angular configuration.

3. A clamping jaw according to claim 1, wherein the clamping surface is shaped.

4. A clamping jaw according to claim 3, wherein the clamping surface is ground.

5. A clamping jaw according to claim 1, wherein the clamping surface is inclined with respect to a longitudinal axis of the metal base body.

6. A clamping jaw according to claim 5, wherein the inclined clamping surface includes a longitudinal groove.

7. A clamping jaw according to claim 6, wherein a portion of the hard metal particles are solder bonded in the longitudinal groove.

* * * * *